UNITED STATES PATENT OFFICE.

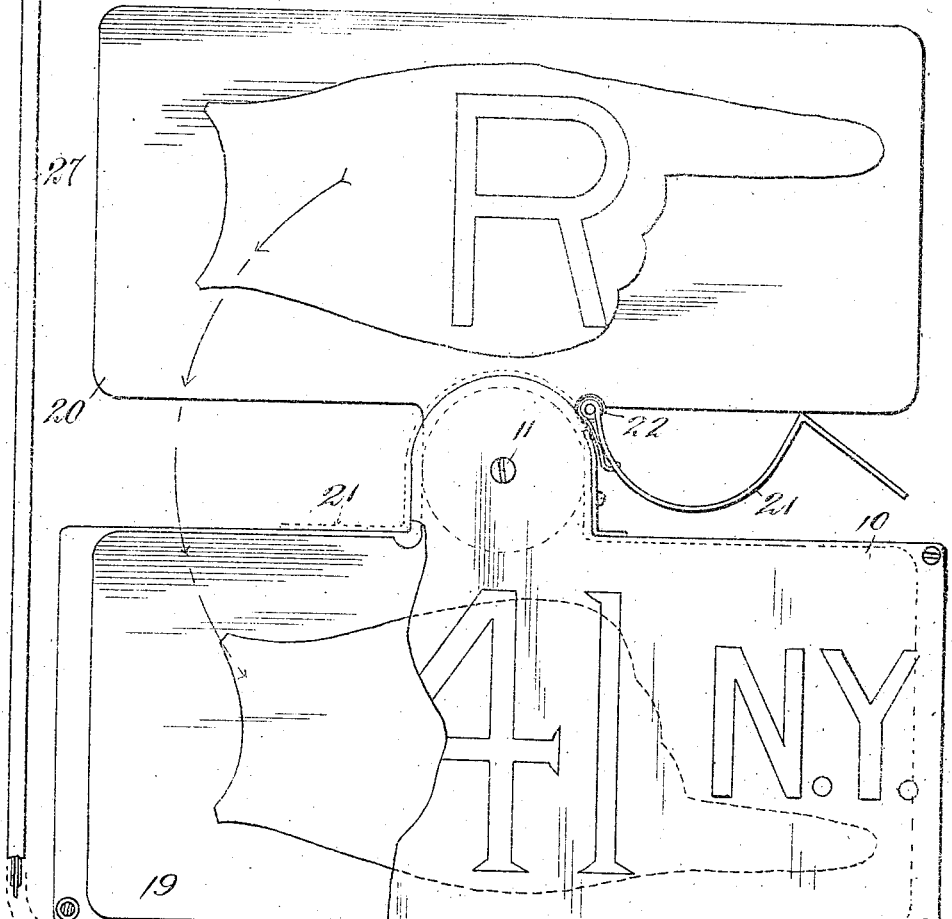

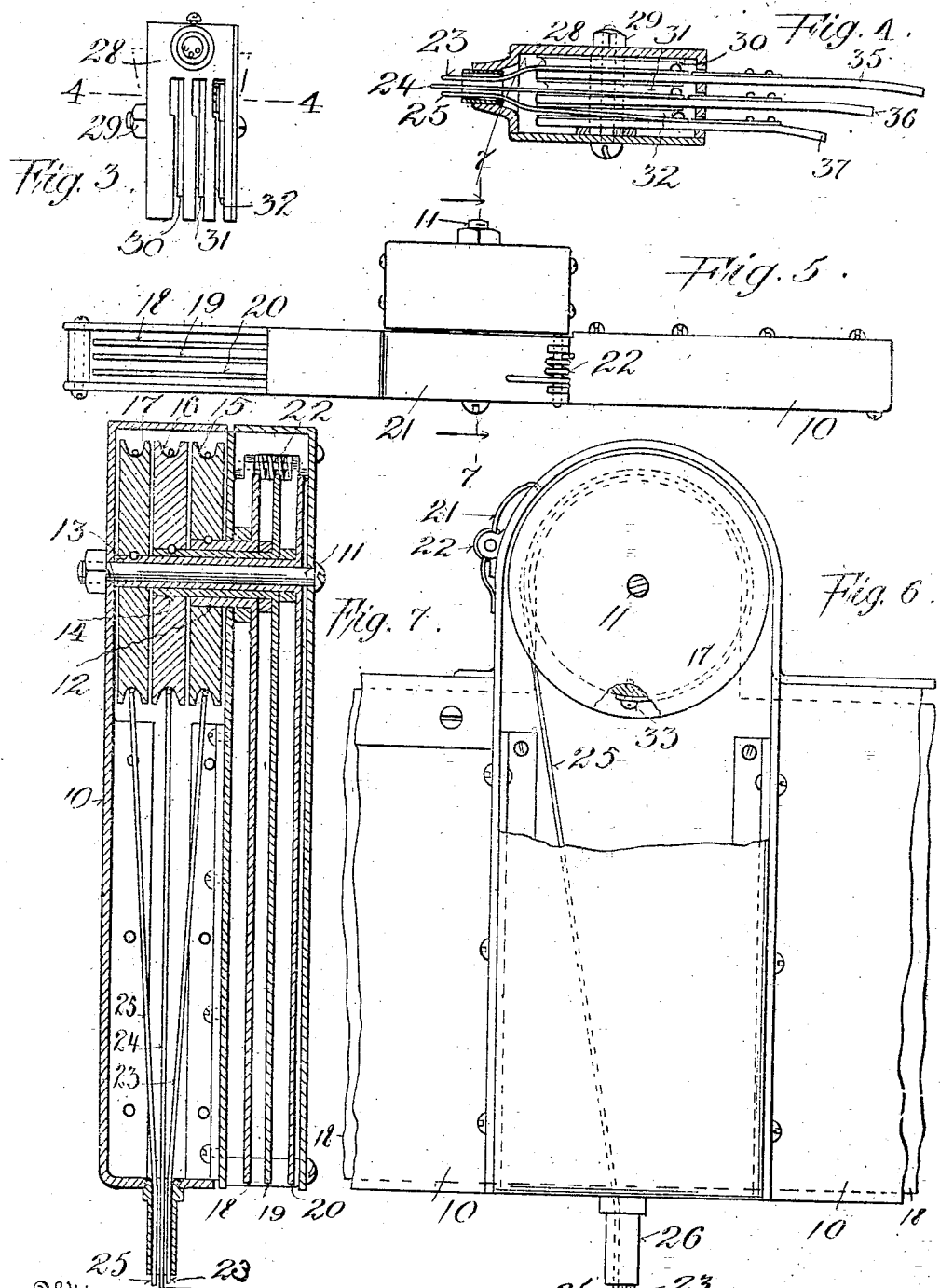

SHOZO HATASHITA, OF DETROIT, MICHIGAN.

SIGNAL DEVICE FOR AUTOMOBILES OR OTHER VEHICLES.

1,172,794.  Specification of Letters Patent.  Patented Feb. 22, 1916.

Application filed March 22, 1912. Serial No. 685,492.

*To all whom it may concern:*

Be it known that I, SHOZO HATASHITA, a subject of the Emperor of Japan, residing in the city of Detroit, county of Wayne, and State of Michigan, have made a certain new and useful Invention in Signal Devices for Automobiles or other Vehicles, of which the following is a specification.

This invention relates to signal devices designed to be employed on the rear end of vehicles.

The object of the invention is to provide a signal device for the rear end of vehicles for the purpose of indicating to other vehicles in its rear, the intended course of travel or movement of the vehicle carrying the signal device.

A further object of the invention is to simplify and improve the construction of signaling devices of the character referred to.

Other objects of the invention will appear more fully hereinafter.

The invention consists substantially in the construction, combination, location and relative arrangement of part, all as will be more fully hereinafter set forth, as shown in the accompanying drawing, and finally pointed out in the appended claims.

Referring to the accompanying drawings, and to the various views and reference signs appearing thereon, Figure 1 is a view in elevation showing a construction of signal devices embodying the principles of my invention. Fig. 2 is a detail view, partly in side elevation and partly in section showing a construction of control device for the signal and embodying the principles of my invention. Fig. 3 is a detail view in edge elevation of the control device shown in Fig. 2. Fig. 4 is a broken detail view in section on the line 4, 4, Fig. 3, looking in the direction of the arrows. Fig. 5 is a top plan view of the construction of signal device shown in Fig. 1. Fig. 6 is a view in side elevation, parts broken out, parts broken off and parts in section. Fig. 7 is a broken detail view in section on the line 7, 7, Fig. 5, looking in the direction of the arrows.

The same part is designated by the same reference sign wherever it occurs throughout the several views.

A frequent source of accident due to the collision of automobiles is the inability of the driver of an automobile to know what the movements are going to be of the car in advance, or in front. It frequently happens that a car or automobile wishes to turn either to the right or to the left out of the track, street or road along which it is progressing where it is being immediately followed by a closely adjacent car at the rear. This is particularly liable to occur in congested streets where the traffic of vehicles and carriages is heavy and the vehicles numerous.

It is among the special purposes of my present invention to provide a signal device which is simple in construction and efficient in operation and by which, when suitably manipulated and controlled, the driver of a car is enabled to inform the driver of a car immediately in its rear of the intended departure from the course of travel of the car carrying the signal device, as for instance, when it is desired to stop, turn toward the right or to turn toward the left.

In carrying out my invention I propose to locate the signal device upon the rear end of the motor car or automobile, or other vehicle, and to control the same from the front end or the driver's seat of the machine. I also propose to employ a construction of signal device which, when suitably manipulated, will raise or display to the view of the driver of the car immediately at the rear, a signal showing whether or not the car carrying the signal device is going to stop, or to turn, or the direction in which it proposes to proceed.

I also propose to provide a construction of signal device of the character referred to which will be effective for use not only in the day time but also at night, this being accomplished by employing the construction in connection with the ordinary or usual night light or signal lamp.

In carrying out my invention I propose to employ a casing within which is pivotally mounted a series of signal plates. These I mount within the casing so as to be capable of independent rocking or swinging movement. Each of these signal plates may correspond to a particular direction to be indicated to the driver of the car in the rear. For instance, one of these signal plates may indicate that the car on which the device is carried is to turn toward the right; another indicating that it is the intention to turn toward the left. Another may indicate the intention to stop, and so on. I also propose to independently control these several signal plates from a convenient point at the front of the car by means of control levers arranged in suitable convenient relation to the driver of the car carrying the signal device. I therefore propose to employ as many control levers as there are signal plates in the casing, it being understood that the casing is to be mounted upon the rear end of the car to which the signal device is to be applied, and a convenient arrangement is to employ the casing containing the signal plates also as a support for the license or number plate for the car.

In the drawings, reference numeral 10, designates a casing having a chamber within or transversely across which is mounted a stud or rod 11, forming a pivotal support for a series of sleeves 12, 13, 14. (See Fig. 7). These several sleeves are nested one within the other. The sleeve 14 takes bearing directly upon the stud or bolt 11, while the sleeve 13, telescopes upon the sleeve 14, and the sleeve 12, telescopes upon the sleeve 13. The sleeves 12, 13, 14, have respectively mounted thereon, and connected thereto to rotate therewith, the operating pulleys 15, 16, 17. And each sleeve 12, 13, 14, carries a signal plate 18, 19, 20, so as to move or to be rotatively actuated thereby and therewith. These several signal plates are normally housed within the casing 10. When their operating wheels 15, 16, 17, etc., are operated the particular plate carried by the sleeve upon which the operated wheel is mounted, is rocked or swung out of its housing within the casing and into position to be displaced, as clearly indicated in Fig. 1, where the signal plate 20, for instance, has been elevated or raised by the operation of the corresponding sleeve 14, and operating wheel 17. The opening in the upper edge of the casing 10, through which the signal plates pass while being raised into display position or retracted into housed position is provided with a cover plate 21, which is acted upon by a spring tension indicated at 22, so as to yield against the movement of the signal plates into their elevated or displayed relation, as indicated in Fig. 1, the spring tension exerted upon the cover plate serving to permit the yielding movement of the cover plate 21, when the display or signal plate is raised into display position and also serving to return or restore the signal plate to its housed relation when such restoration is to be made. The operating wheels 15, 16, 17, above mentioned are positioned within the housing or casing 10, and in the particular form illustrated, are in the shape of grooved pulleys over which respectively operate cords, wires, or other suitable operating means 23, 24, 25. These operating connections extend out through the casing 10, as indicated at 26, and may be conveniently confined or carried within a suitable tube or casing 27, which is conveniently led through or along the side of the automobile or other vehicle to the front end thereof and suitably connected to the operating or controlling devices located within convenient reach of the driver of the vehicle. A simple control construction is shown and described, but I wish it to be understood that my invention, as defined in the claims, is not to be limited or restricted to the exact details shown. The wire, cord or other connections 23, 24, 25, extend into a control casing 28, within which is mounted a pivot rod or stud 29, upon which is journaled a corresponding number of operating wheels or pulleys 30, 31, 32. The ends of the wires, cords, or other connections 23, 24, 25, are respectively secured to the peripheral surfaces of the pulleys, 15, 16, 17, and 30, 31, 32, after passing partially around the same as indicated at 33, Fig. 6, and 34, Fig. 2. Connected to each of the controlling pulleys or members 30, 31, 32, is an operating handle or lever 35, 36, 37, corresponding, respectively, to the pulleys 30, 31, 32, and the operating cords, wires, or other connections 23, 24, 25. These operating levers respectively extend through slots or openings in the case 28, and into convenient positions to be grasped, manipulated, and operated by the driver of the automobile or other vehicle. They should also be marked correspondingly to the signal plates 18, 19, 20, in casing 10. Thus where a signal device indicating an intended turn of the automobile or vehicle toward the right, and another plate indicating an intended turn toward the left, and another plate to indicate an intention to stop, is employed, the operating levers 35, 36, 37, should bear corresponding designations, as, for instance, the letter R on one of them to correspond with the signal plate similarly marked and indicating an intended turn toward the right. Similarly another one of the control levers may have the letter L, corresponding with a signal plate indicating an intention to turn toward the left.

Another of the control levers may have the letter S corresponding with a signal plate indicating an intention to stop.

Of course, it is obvious that other signal plates carrying other designating signals may be employed with a corresponding number of operating levers and connections.

It will be understood that the several operating levers 35, 36, 37, are independently operable. In Fig. 1, I have shown the signal plate corresponding to an intention to turn toward the right shown in elevated or raised display position and I have shown in the same figure the corresponding operating lever 37, carrying the designation R, as displaced into operated position with reference to the other levers respectively marked L, and S. I have also indicated in dotted lines in Fig. 2 the operation of a control lever.

The operation of the apparatus is exceedingly simple and will be readily understood.

Assuming that the signal plates 18, 19, and 20 are within the housing or casing 10, and in their retracted position, and it is desired to raise or elevate one of them into display position, say, for instance, the signal plate indicating an intention to turn toward the right. Thereupon the operating lever marked R is rocked or swung from the position thereof shown in Fig. 2 into the position thereof shown in Fig. 1. This operating lever being connected to a pulley or sheave 32, the corresponding cord, wire, or other connection 23, for instance, is wound up upon the pulley 32. This action or pull being transmitted through the wire, cord or other connection 23, to the pulley 15, within casing 10, causes said pulley to be rotatively displaced thereby causing its sleeve 12, to be rotated and thereby causing the corresponding signal display plate to be raised out of the casing or housing within which it is contained and to rock or swing about the axis of pivot bolt 11, into elevated or raised position as indicated in Fig. 1. When moved into such elevated or raised position it forces the hinged spring actuated cover plate 21, backwardly, as indicated in Fig. 1, the tension of the spring acting thereon to normally return or restore the signal plate to its housed position. When the movement indicated by the display signal plate has been completed and it is desired to restore the signal device to its initial position, the operating lever R is returned or restored to its original position, thereby relieving the pull on the corresponding wire, cord, or other connection, and hence permitting the spring of the hinged plate 21, to perform its function of returning or restoring the raised display plate to its initial housed position, thereby also returning or restoring the corresponding operating wheel 15, 16, or 17, and its operating connections to their normal or initial position.

It will be observed from the foregoing description that I provide an exceedingly simple, inexpensive signal mechanism wherein the operation of the various signal plates is accomplished independently of the others and yet the arrangement is such that they mutually coöperate with each other being mounted upon the same pivot support thus enabling me to provide an exceedingly simple, compact apparatus.

Where it is desired to employ a signal mechanism, embodying the principles of my invention, at night, it will be understood that the signal plates will be of transparent material and preferably of different colors and a source of light will be positioned immediately behind such signal plates when occupying their raised position thereby disclosing the corresponding color, and indicating at night the intended direction of movement of the automobile or other vehicle.

Many variations and changes in the details of construction and arrangement will readily occur to persons skilled in the art and still fall within the spirit and scope of my invention. I do not desire, therefore, to be limited or restricted to the specific details shown and described. But Having now set forth the object and nature of my invention and a construction embodying the principles thereof, what I claim as new and useful, and of my own invention, and desire to secure by Letters Patent of the United States, is:

In a signal device for vehicles, a casing located at the rear end of the vehicle, and having a spring actuated hinged top or cover, a stud bolt mounted within said casing, a series of sleeves nested the one inside the other and journaled upon said stud bolt and each carrying a signal display plate, a corresponding series of levers located at the front end of the vehicle, connections respectively operated by said levers for independently rotating said sleeves so as to raise their corresponding signal plates out of said casing and against the action of said spring actuated cover, the latter constantly tending to return or restore said signal display plate into housed position within said casing.

In testimony whereof I have hereunto set my hand in the presence of the subscribing witnesses, on this eleventh day of March, A. D., 1912.

SHOZO HATASHITA

Witnesses:
W. ELRICH,
R. B. KANE.